United States Patent [19]

Rowe et al.

[11] Patent Number: 5,744,437

[45] Date of Patent: Apr. 28, 1998

[54] SINGLE PHASE LIQUID COMPOSITION FOR CLEANING AND PAINT STRIPPING AND USE THEREOF

[75] Inventors: Edward A. Rowe, Grand Island; Hang-Chang Bobby Chen, Getzville; Mark E. Lindrose, Buffalo, all of N.Y.

[73] Assignee: Occidental Chemical Corporation, Niagara Falls, N.Y.

[21] Appl. No.: 753,464

[22] Filed: Nov. 25, 1996

Related U.S. Application Data

[63] Continuation-in-part of Ser. No. 339,519, Nov. 14, 1994, abandoned.

[51] Int. Cl.$^6$ .............................. C11D 3/20; C11D 3/24; C11D 1/22; B08B 3/08

[52] U.S. Cl. ..................... 510/204; 510/206; 510/203; 510/202; 510/365; 510/426; 510/432; 134/38; 134/40; 134/42

[58] Field of Search ................... 134/38, 40, 42; 106/311; 252/558, 162, 170, 171, 173, DIG. 8; 510/201, 202, 203, 204, 206, 412, 405, 426, 427, 365, 432

[56] References Cited

U.S. PATENT DOCUMENTS

| | | | |
|---|---|---|---|
| 3,835,070 | 9/1974 | Beck | 252/172 |
| 4,096,185 | 6/1978 | Seiwell | 260/581 |
| 4,578,209 | 3/1986 | Hisamoto et al. | 252/143 |
| 5,096,501 | 3/1992 | Dishart et al. | 134/10 |
| 5,196,136 | 3/1993 | Dishart et al. | 252/170 |
| 5,209,785 | 5/1993 | Brewe et al. | 134/40 |
| 5,232,460 | 8/1993 | Botz | 8/141 |
| 5,240,641 | 8/1993 | Rowe | 252/364 |
| 5,242,502 | 9/1993 | Rowe | 134/40 X |
| 5,244,507 | 9/1993 | Rowe | 134/38 |
| 5,431,810 | 7/1995 | Ruso et al. | 210/104 |
| 5,514,294 | 5/1996 | Bohnert et al. | 252/170 |
| 5,520,768 | 5/1996 | Crook et al. | 156/319 |

FOREIGN PATENT DOCUMENTS 7-278594  10/1995  Japan .

OTHER PUBLICATIONS

"Aqueous and Semi-Aqueous Alternatives for CFC-113 and Methyl Chloroform Cleaning of Printed Circuit Board Assemblies", United States Environmental Protection Agency, p. 21, Jun. 1991.

"Axarel (TM) Cleaning Agent", DuPont Electronics, six page brochure, Feb. 1990.

Kuraray MMB 3-Methyl-3-methoxy butanol Product Brochure Feb, 1992.

*Primary Examiner*—Douglas J. McGinty
*Attorney, Agent, or Firm*—Richard D. Fuerle; Arthur S. Cookfair

[57] ABSTRACT

Disclosed is a single phase liquid composition comprising 0.5 to 30 wt % of a benzotrifluoride solvent, about 0.5 to about 50 wt % of a glycol ether cosolvent, up to about 50 wt % of an alkanol, up to about 10 wt % of a surfactant, and the remainder water. The composition is effective in cleaning hard surfaces, stripping paint, and as a carrier.

21 Claims, 10 Drawing Sheets

SINGLE PHASE LIQUID COMPOSITION FOR CLEANING AND PAINT STRIPPING AND USE THEREOF

This application is a continuation-in-part of application Ser. No. 08/339,519, filed Nov. 14, 1994, now abandoned.

BACKGROUND OF THE INVENTION

This invention relates to a single phase liquid composition which contains both organic components and water. In particular, the composition contains a chlorinated benzotrifluoride solvent, a glycol ether cosolvent, water, and an optional alkanol and an optional surfactant.

U.S. Pat. No. 3,835,070 describes a hard surface cleaner that contains methylene chloride, a monoalkyl ether of ethylene glycol, an alcohol, an inorganic builder, an anionic surfactant, and water. Compositions such as the composition of that patent, which employ methylene chloride as the principal organic solvent, are highly effective in removing grease, oil, and other organic soils from surfaces. However, methylene chloride is classified as a possible carcinogen by the International Agency for Research on Cancer and it is also listed as a hazardous air pollutant under the Clean Air Act. Safe and effective alternatives to methylene chloride-based cleaning compositions have not, until now, been found.

SUMMARY OF THE INVENTION

We have discovered a water-containing composition based on a chlorinated benzotrifluoride, such as parachlorobenzotrifluoride (PCBTF) or 3,4-dichlorobenzotrifluoride (DCBTF), that is a single phase liquid. Unlike methylene chloride, PCBTF and DCBTF have not been listed as hazardous under the Clean Air Act and the Superfund Amendment and Reauthorization Act (SARA), Title III (Section 313). The composition of this invention is effective in cleaning, and has been found to be stable at room temperature for at least several months. While PCBTF and DCBTF are less miscible in water than is methylene chloride, we have found that single phase compositions can be prepared by including in the composition a glycol ether cosolvent. We have further found that the range of single phase miscibility is extended by inclusion within the composition of an alkanol from $C_1$ to $C_3$. Also, most of the compositions within the scope of this invention are non-flammable under ASTM test method D3065-72.

The single phase mixture of this invention is not only useful in cleaning hard surfaces, but we have unexpectedly discovered that it is also effective as a paint stripper, both on latex based and enamel paints.

DESCRIPTION OF THE INVENTION

Figure 1:
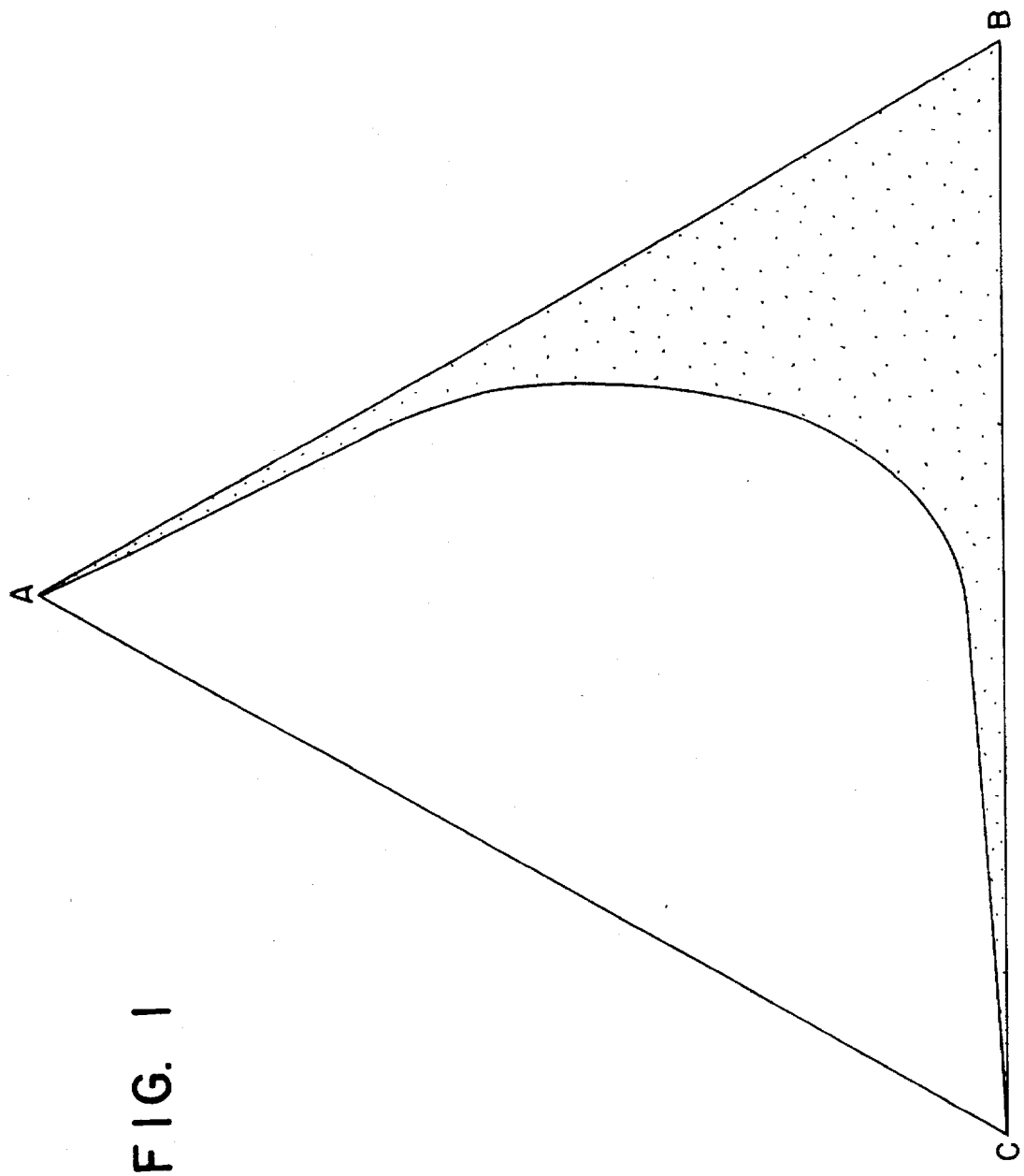
FIGS. 1 to 10 are miscibility phase diagrams further explained in Example 1.

The liquid compositions of this invention are single phase mixtures, not emulsions. The single phase of the compositions falls within the range of about 0.5 to about 30 wt % solvent, about 0.5 to about 50 wt % cosolvent, 0 to about 50 wt % alkanol, 0 to about 10 wt % surfactant, and the remainder water.

For use as an industrial hard surface cleaner the composition preferably is about 5 to about 20 wt % solvent, about 10 to about 30 wt % cosolvent, about 2 to about 20 wt % alkanol, about 0.5 to about 5 wt % surfactant, and the balance water. For a consumer or household cleaner the composition is preferably about 2 to about 10 wt % solvent, about 5 to about 30 wt % cosolvent, about 2 to about 20 wt % alkanol, about 0.5 to about 10 wt % surfactant, and the balance water. Also, compositions containing less than 10 wt % alkanol have a flashpoint less than the alkanol.

The solvent has the general formula

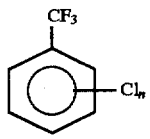

where "n" is 1 or 2 and is preferably 1. Examples included ortho, meta, and parachlorobenzotrifluoride and 2,3-, 3,4-, 2,5-, and 2,6-dichlorobenzotrifluoride. PCBTF, DCBTF, or a mixture thereof is preferred as those solvents are commercially available and they are both about equally effective, but PCBTF is especially preferred as it is less expensive. The amount of solvent is preferably about 5 to about 20 wt % as if less solvent is used the mixture is less effective in cleaning, and it is difficult to form a single phase mixture if more solvent is present.

The cosolvent is a glycol ether having the formula

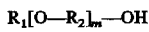

where $R_1$ and $R_2$ are each independently selected from alkyl from $C_1$ to $C_6$ and "m" is 1 or 2. In the formula, $R_1$ is preferably $C_1$ to $C_4$ and $R_2$ is preferably $C_1$ to $C_5$ as those ether alcohols are more readily available. Examples of presently preferred glycol ether cosolvents include ethylene glycol monobutyl ether (EB), diethylene glycol monobutyl ether, propylene glycol monomethyl ether (PM), ethylene glycol ethyl ether, propylene glycol ethyl ether, and 3-methoxy-3-methyl-1-butanol (MMB) because those cosolvents are commercially available. If too much cosolvent is used the mixture loses cleaning power and if too little is used the mixture may not be miscible. Preferably, about 10 to about 30 wt % cosolvent is used.

The composition can optionally contain an alkanol from $C_1$ to $C_3$. An alkanol is preferably present in the mixture because it increases the miscibilty of the solvent with the water. Preferably, about 2 to about 20 wt % of an alkanol is present. If too much alkanol is present the cleaning power of the mixture may be reduced and the flammability increased.

Examples of alkanols that can be used include methanol, ethanol, propanol, and isopropanol (IPA). Higher alkanols, such as butanol, do not seem to be effective. The preferred alkanols are ethanol and isopropanol and isopropanol is particularly preferred as it is not subject to the controls that ethanol is.

Another optional ingredient that can be present if desired is a surfactant. While a surfactant may not increase the range of miscibility, it is useful in solubilizing oils and greases. A preferred amount of surfactant is about 0.5 to about 5 wt %. The surfactant may be cationic, anionic, or non- ionic, but anionic surfactants are preferred as they seem to be more effective in detergent-type compositions. Examples of suitable surfactants include modified alkanolamides, ammonium salts of sulfonated alcohol ethoxylates, triethyl amine linear alkylate sulfonates, and ethoxylated primary alcohols. Examples of preferred anionic surfactants include compounds having the formulas

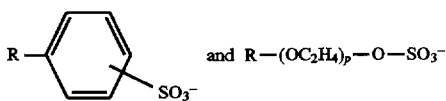

where R is alkyl from $C_{10}$ to $C_{14}$, "p" is an integer from 3 to 18, and the cation is hydrogen, alkali metal, or ammonium. The preferred surfactant is sodium dodecyl benzene sulfonate as it is commercially available and has been found to be effective.

The remainder of the composition is water. The mixture can be prepared by adding the components in any order, but it is preferable to add the surfactant last, as it is typically a solid and that facilitates mixing.

The composition can be packaged in a spray can, a pump can, or other type of container. The composition can be used to remove grease, oil, or other types of soil from hard surfaces. The composition is applied to the surface by spraying, dipping, wiping, or other means and is then removed from the surface by wiping, spraying, dipping, or other means. The composition is useful in cleaning brakes and other automobile parts, walls, flooring, and other hard surfaces. The composition can also be used to remove paint from a surface by applying the composition to the paint, permitting the composition to at least begin to attack the paint, and then wiping, rubbing, scraping, or otherwise removing the paint from the surface. Usually, only about 15 minutes are required before the composition begins to attack the paint. The composition may also be useful as a carrier for paints, pesticides (e.g., herbicides, fungicides, insecticides) and inks. About 0.1 to about 10 wt % paint or pesticide can be added to the composition (used on total composition weight) for these uses. The following examples further illustrate this invention.

EXAMPLE 1

Compositions were prepared from various proportions of PCBTF, water, EB, MMB, IPA, and SDBS. The number of phases of each composition was observed and the results were used to draw the miscibility diagrams of FIGS. 1 to 9. In FIGS. 1 to 9 the shaded areas are the proportions that are miscible. The following table gives the composition tested.

| | Variable Components | | | Other |
|---|---|---|---|---|
| Figure | A | B | C | Components |
| 1 | PCBTF | EB | WATER | — |
| 2 | PCBTF | EB | WATER | 1% SDBS |
| 3 | PCBTF | EB | WATER | 20% METHANOL |
| 4 | PCBTF | EB | WATER | 40% METHANOL |
| 5 | PCBTF | EB | WATER | 20% IPA |
| 6 | PCBTF | EB | WATER | 20% IPA 1% SDBS |
| 7 | PCBTF | EB | WATER | 40% IPA |
| 8 | PCBTF | MMB | WATER | — |
| 9 | PCBTF | IPA | WATER | — |
| 10 | PCBTF | PM | WATER | — |

Figure 2:
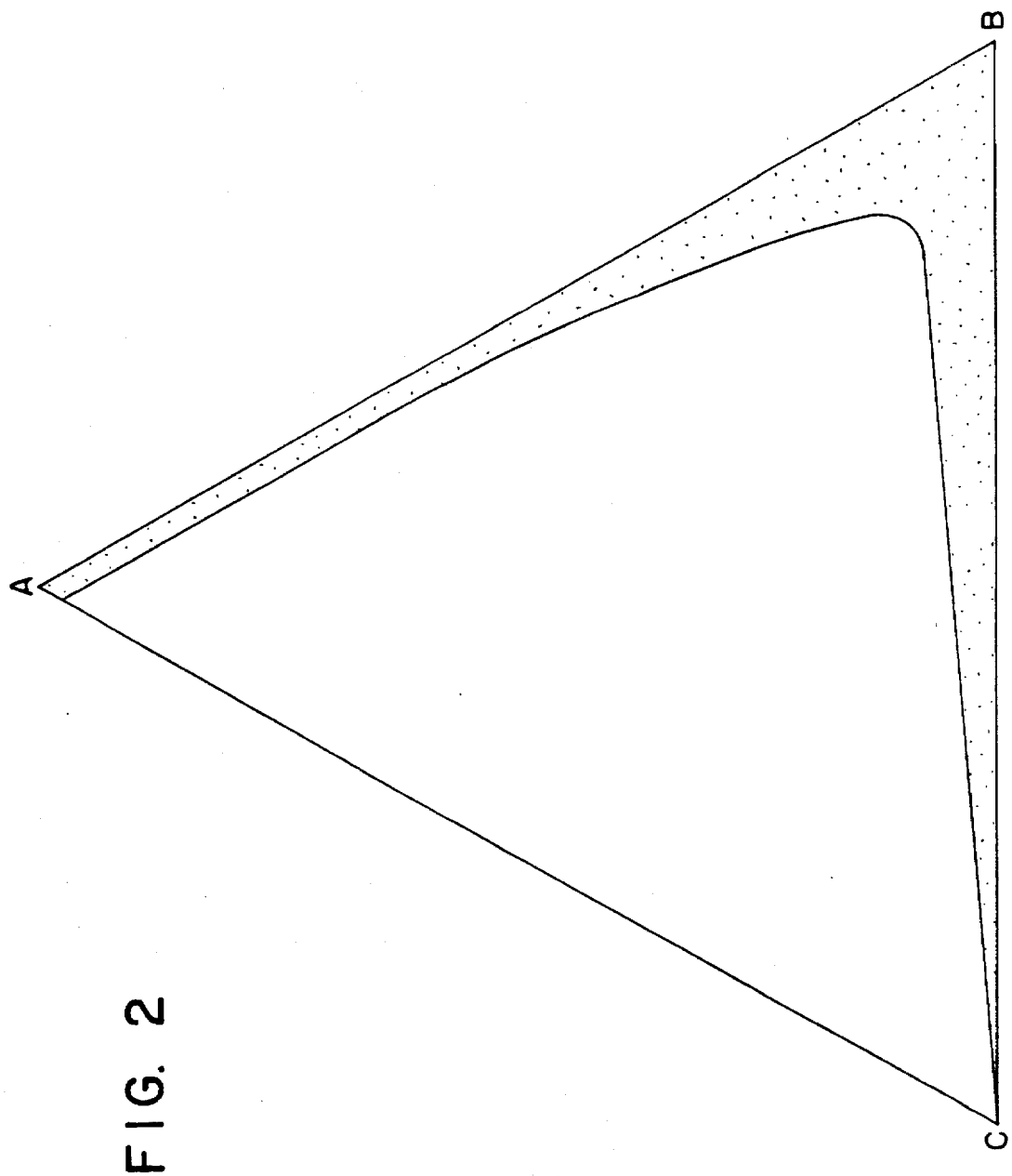
Figure 3:
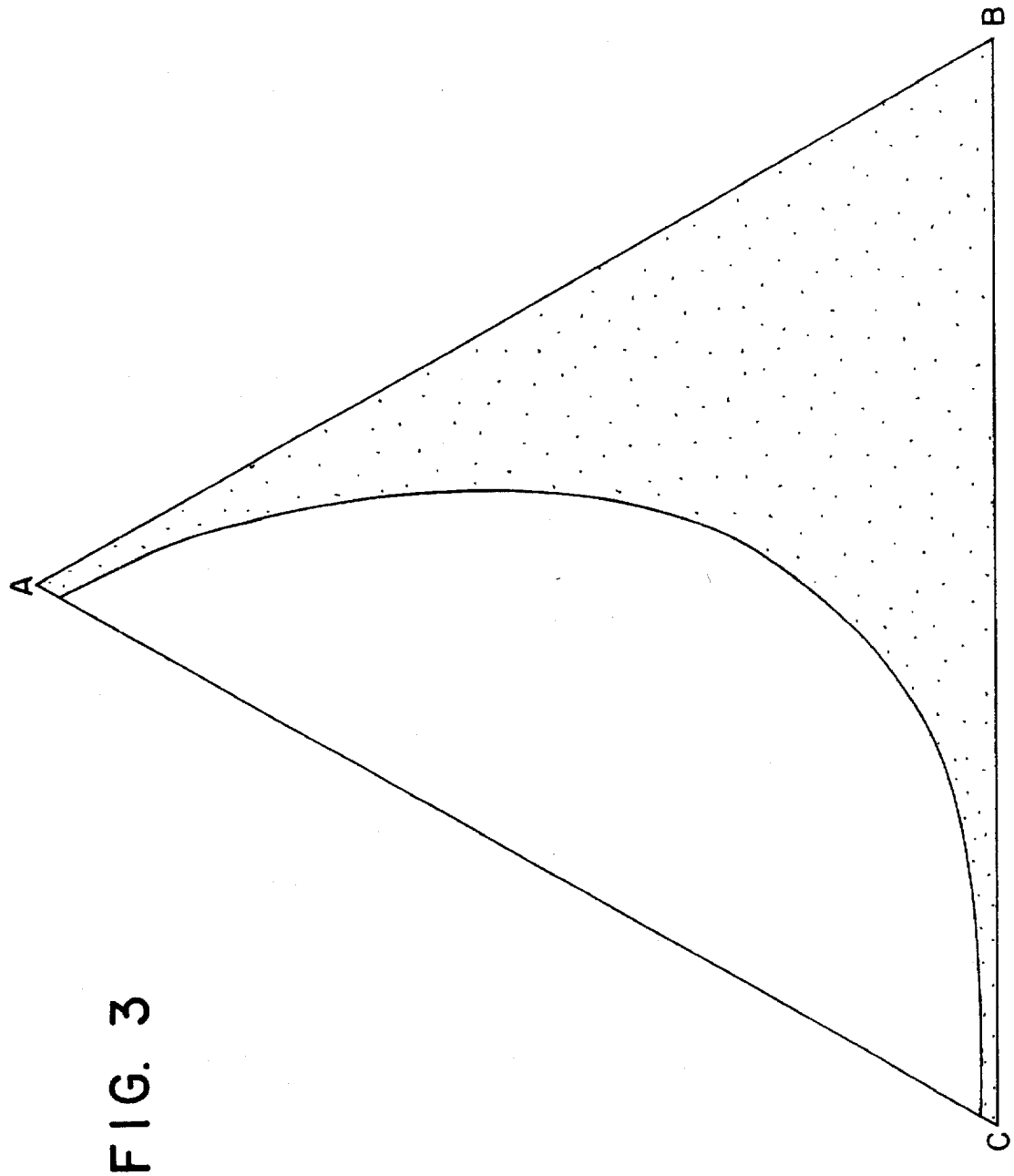
Figure 4:
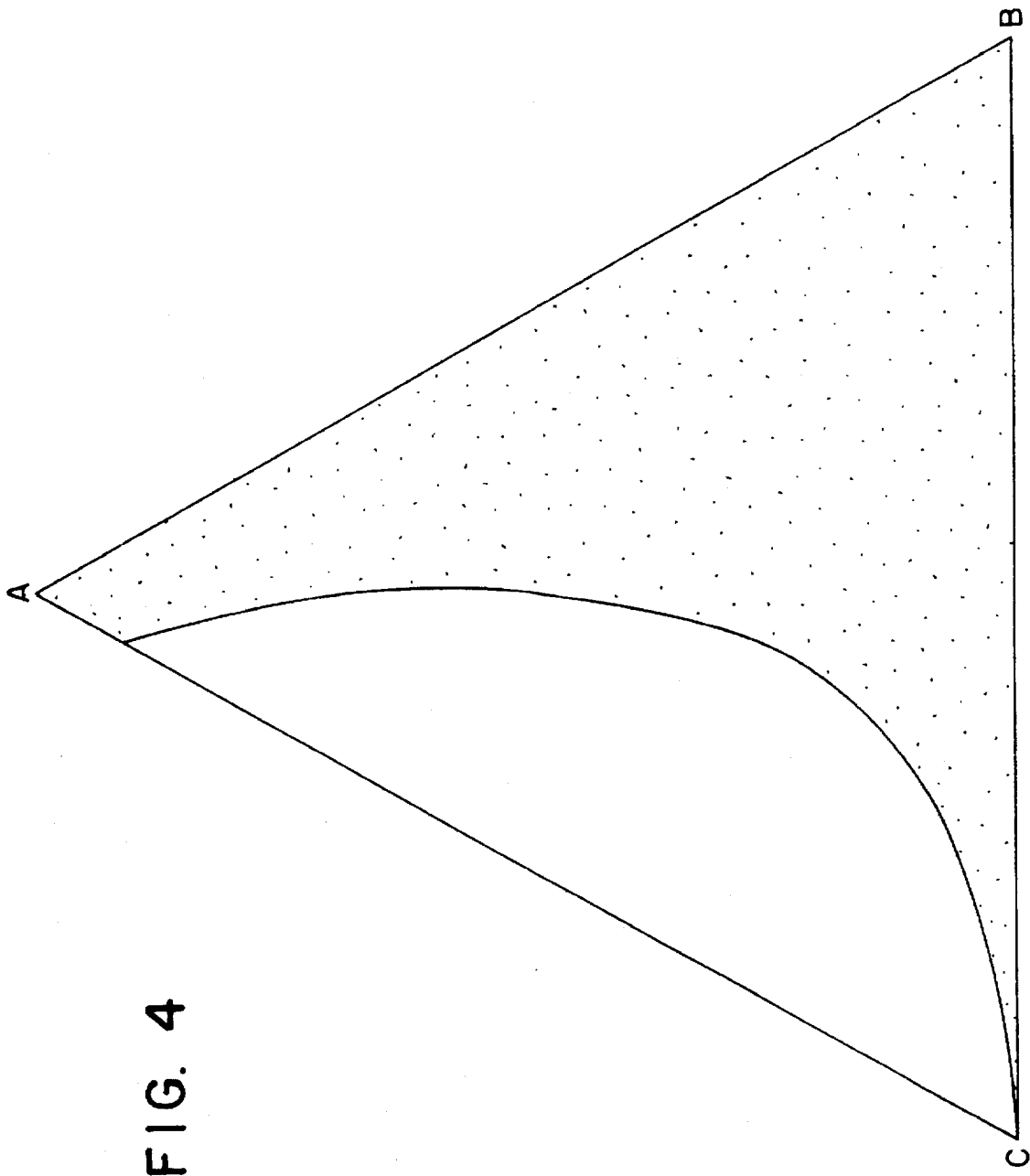
Figure 5:
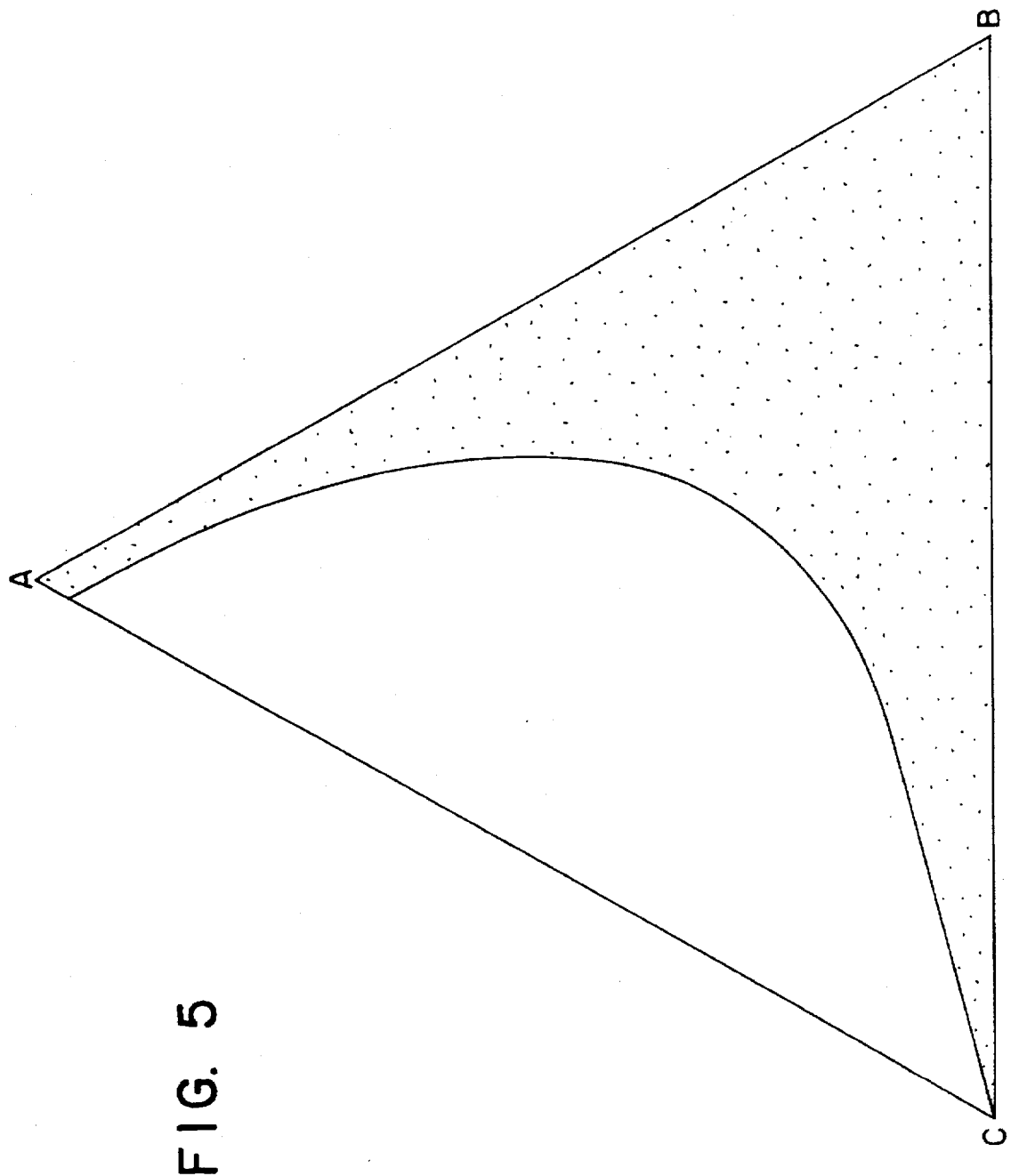
Figure 6:
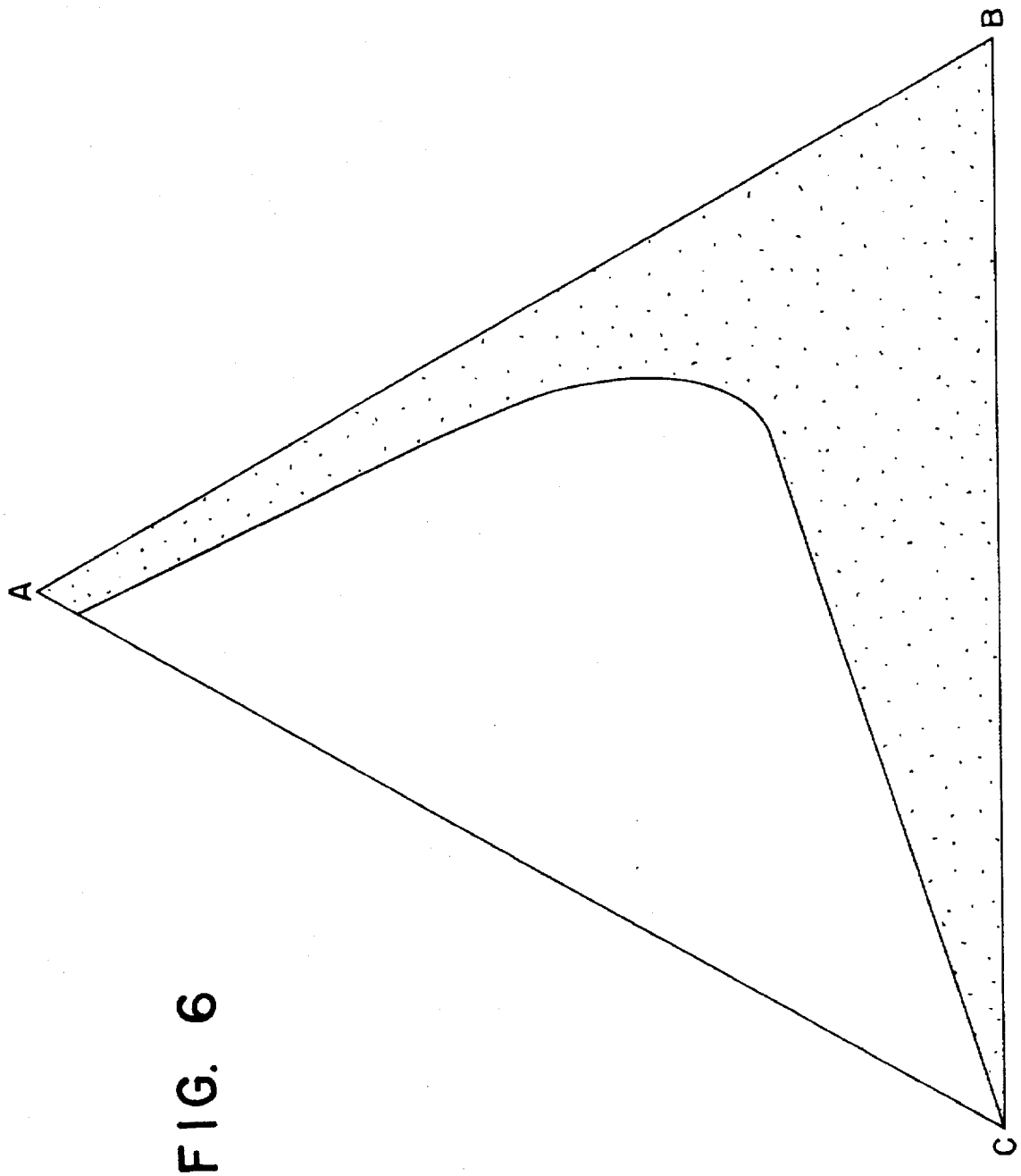
Figure 7:
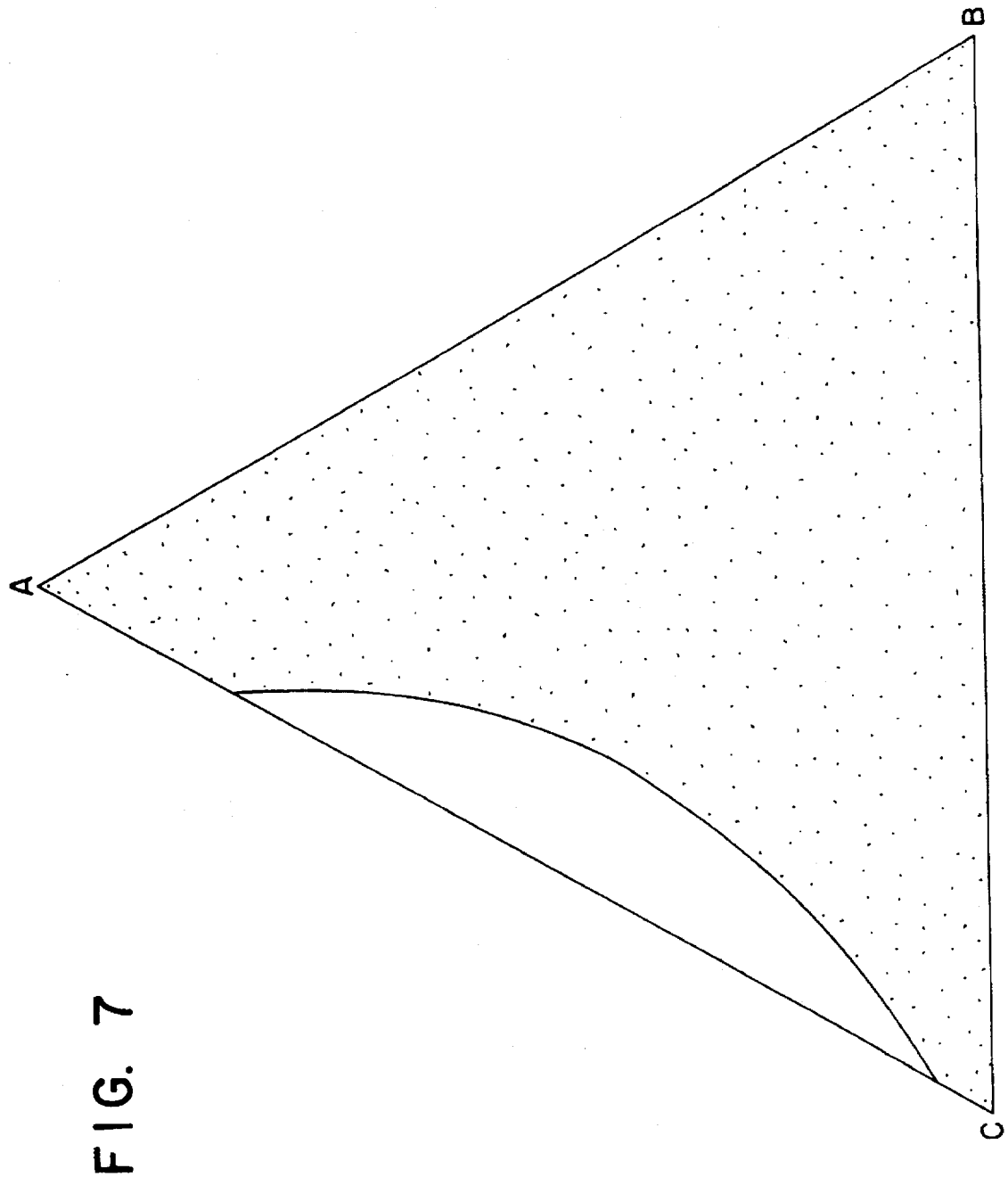
Figure 8:
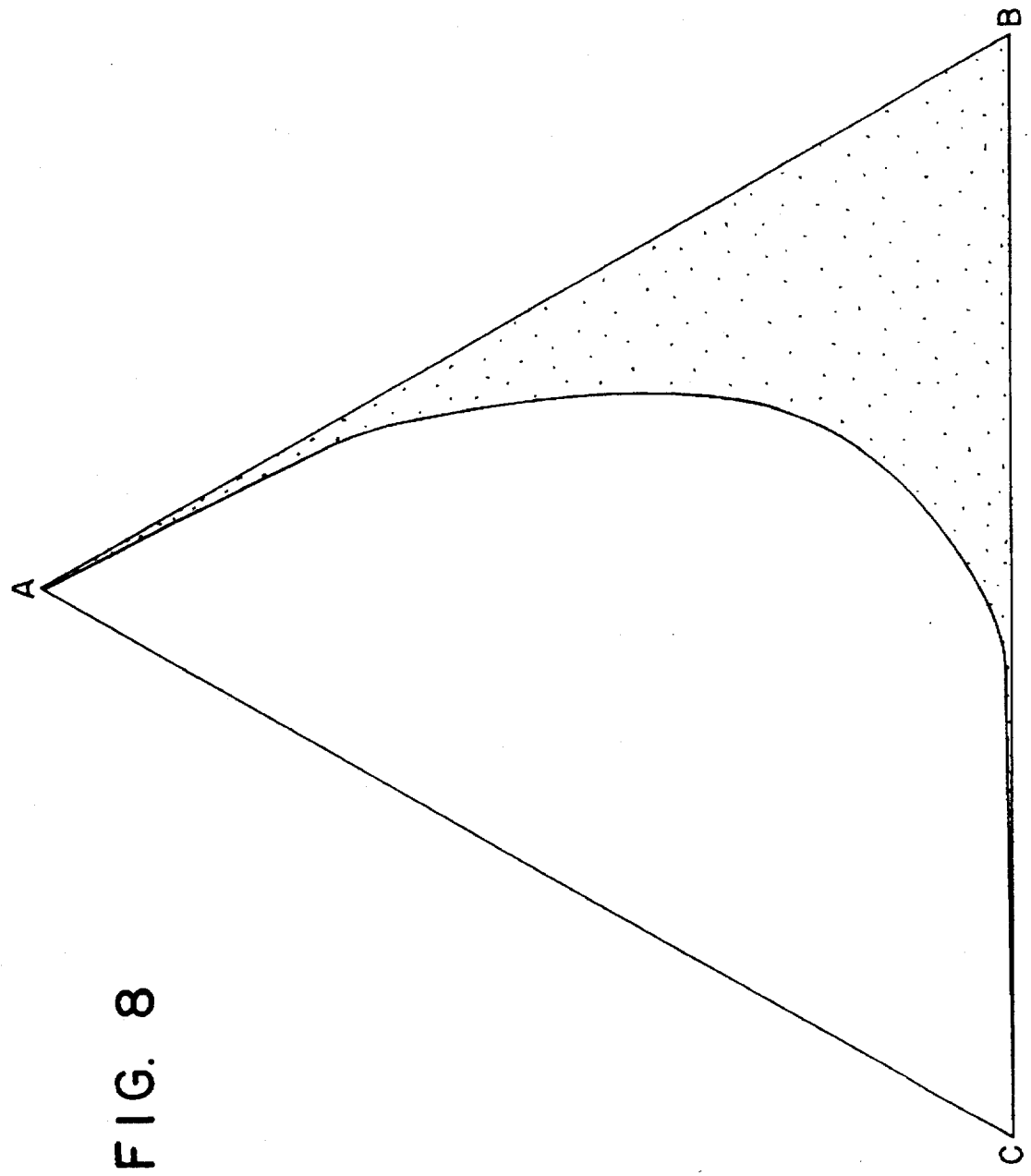
Figure 9:
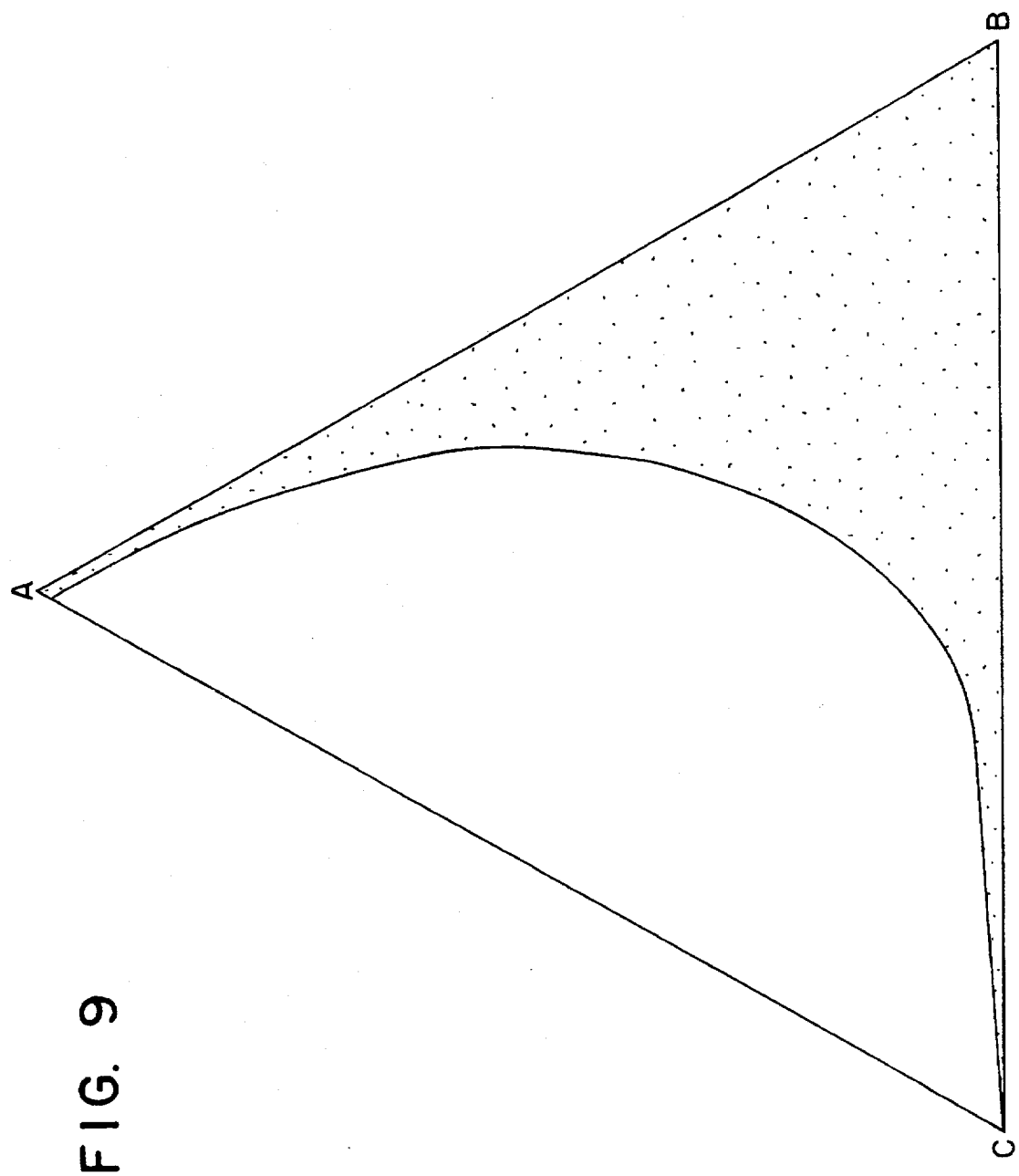
Figure 10:
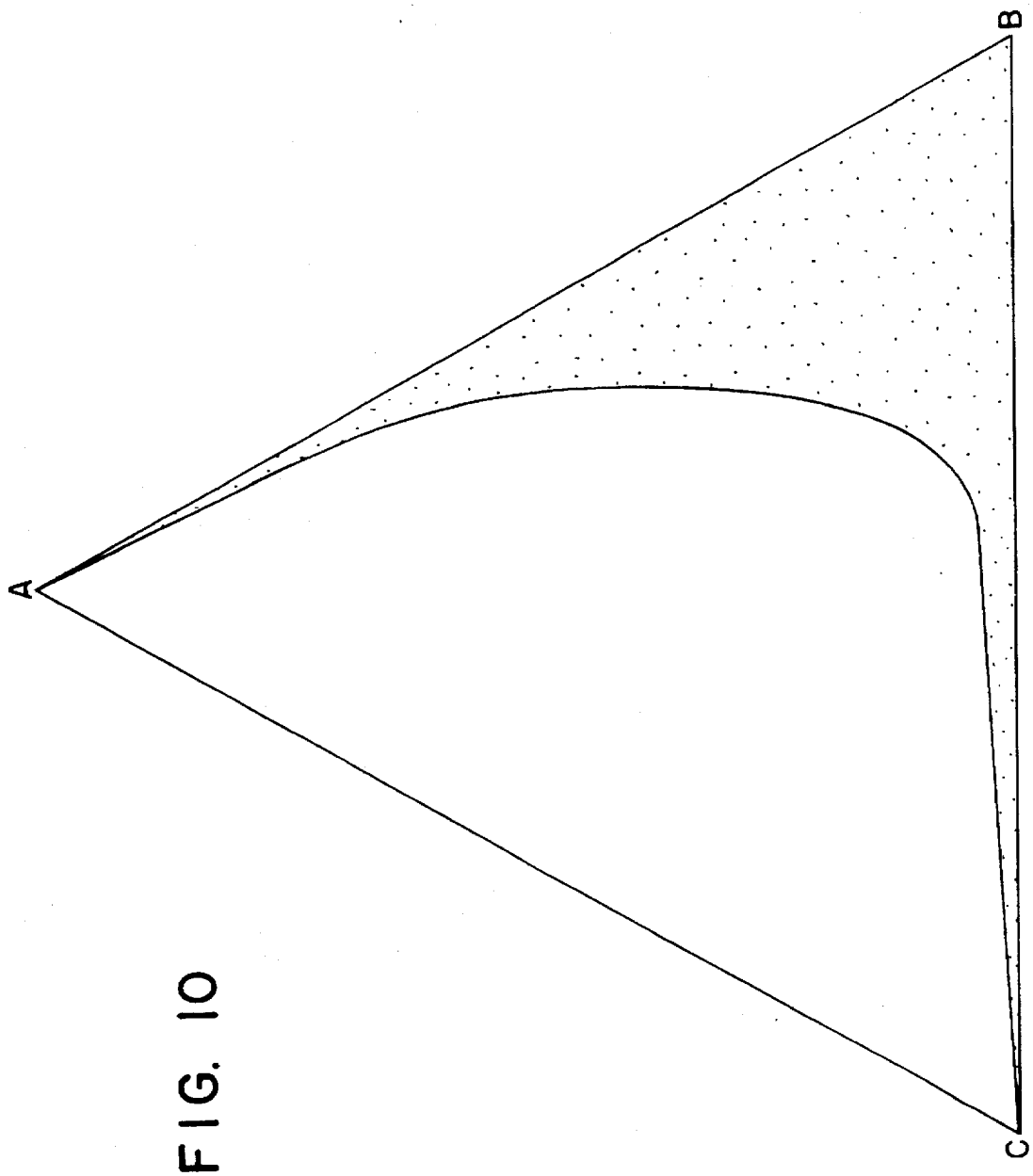

FIGS. 1, 3, and 4 show that methanol was effective in increasing the range of miscibility but that SDBS was not and that 40% methanol was more effective than 20% methanol. FIGS. 2 and 6 show that SDBS did not increase the miscibility of the FIG. 5 composition, and that 40% IPA (FIG. 7) has a wider range of miscibility than does 20% IPA (FIG. 5). FIGS. 8 and 9 show that MMB and IPA are about as effective as EB (FIG. 1).

EXAMPLE 2

A composition was prepared of 16 wt % PCBTF, 20 wt % IPA, 36 wt % B, and 28 wt % water (Composition A). A vial was filled with this composition and a linoleum panel was immersed into the composition at room temperature for one hour. The panel was removed, rinsed with distilled water, and dried for one hour. Examination of the panel showed no signs of softening, swelling, cracking, bleaching, or discoloration.

A No. 2 EP grease (NLGI Grade 2, Jet Lube Marine Use) was applied to linoleum floor panels. the grease was immediately wiped off using cotton balls wetted with the composition and the panels were wiped with cotton balls wetted with distilled water. Three times the panels were greased and cleaned. The 60-degree gloss of the panels were measured using a gloss meter before and after each cleaning. The tests were repeated a total of three times. The average results were:

| Test | Avg. Gloss Before Application | Avg. Gloss After Cleaning |
|---|---|---|
| 1 | 55 | 56 |
| 2 | 58 | 56 |
| 3 | 57 | 57 |

The tests were repeated using a heavy mechanical grease and the average results were:

| Test | Avg. Gloss Before Application | Avg. Gloss After Cleaning |
|---|---|---|
| 1 | 49 | 52 |
| 2 | 61 | 61 |
| 3 | 57 | 57 |

This experiment showed that while cleaning the vinyl surface, the composition did not reduce the glossiness of the panels.

Two coats of paint were applied to a wood panel approximately 3 inches by ¾ inches by 1/16 inch. The first coat was a white enamel and the second coat was a white latex semi-gloss. A drying time of over 24 hours was allowed between coats and a minimum of 24 hours was allowed after the application of the final coat before testing. The panel was placed into the composition at a depth of about 2 inches for about 30 minutes. The top coat of paint was easily wiped off and the undercoat was stripped by repeatedly rubbing with cottonballs wetted with the test composition.

The paint was also applied to stainless steel panels about 3 inches by ½ inch by 1/16 inch. The stainless steel panels were placed in three different compositions: Composition A from Example 2, Composition B, a composition of 5 wt % PCBTF, 50 wt % IPA, and 45 wt % water, and Composition C, a composition of 5 wt % PCBTF, 55 wt % EB, and 40 wt % water. The paint on panels immersed in Composition A was easily scraped off. The top coat of paint on the panel immersed in Compositions B and C became sticky when scraped. This experiment showed that the composition was more effective as a paint stripper if both IPA and EB were present.

EXAMPLE 3

A Composition D was prepared of 15.8 wt % PCBTF, 19.8 wt % IPA 35.6 wt % EB, 27.7 wt % water, and 0.9 wt % SDBS. As in Example 2, a linoleum panel was placed in the composition for over 18 hours, removed, rinsed with distilled water, and dried for one hour. There were no signs of softening, swelling, cracking, bleaching, or discoloration of the panel. The composition could therefore be applied to vinyl flooring without damage to the flooring.

Two 4.5 inch by 4.5 inch vinyl floor test panels were coated with each of the following lubricants and greases:

| Lubricant or Grease | Panel |
| --- | --- |
| No. 2 EP grease (NLGI Grade 2, Jet Lube Marine Use) | 1A and 1B |
| No. 2 heavy mechanical grease | 2A and 2B |
| No. 3 anti-sieze lubricant, C5-A | 3A and 3B |

Following ASTM Test D1792-82, the coated panels were stored in an oven at a temperature of 37 ±1° C. for at least 48 hours to accelerate the aging of the grease soils. Panels 1A, 2A, and 3A were wiped twice with dry cotton balls. Dark stains remained on panel 3A. While no stain was left on panels 1A and 2A, a greasy residue remained on both panels. Panels 1B, 2B, and 3B were wiped twice with cotton balls wetted with Composition D and neither grease residue nor stain was detected on these panels.

As in Example 2, a No. 2 EP grease (NLGI Grade 2 Jet Lube Marine Use) was applied to linoleum floor panels. The grease was immediately wiped off using cottonballs wetted with Composition D followed by wiping with cottonballs wetted with distilled water. Three consecutive applications and cleanings were made on each panel. A 60-degree gloss test of the panel was made using a gloss meter before the applications and after each cleaning. The tests were repeated a total of three times and the average results were:

| Test | Avg. Gloss Before Application | Avg. Gloss After Cleaning |
| --- | --- | --- |
| 1 | 46 | 47 |
| 2 | 50 | 51 |
| 3 | 60 | 60 |

The tests were repeated using a heavy mechanical grease and the average results were:

| Test | Avg. Gloss Before Application | Avg. Gloss After Cleaning |
| --- | --- | --- |
| 1 | 53 | 55 |
| 2 | 57 | 59 |
| 3 | 63 | 64 |

This test shows that Composition D did not damage the glossiness of the panels.

As in Example 2, stainless steel panels were prepared by applying a white enamel undercoat and either a white enamel semi-gloss topcoat or a white latex semi-gloss topcoat. The panels were placed in the following liquids: (1) Composition D; (2) PCBTF; (3) EB; (4) IPA; and (5) water. For the panels having the white enamel topcoat the paint was easily scraped off the surface after about 29 minutes in immersion in Composition D. After about 50 minutes of immersion in PCBTF and EB a slight wrinkling on the paint along the panel edges was noticed. No degradation of the paint was found in the panels immersed in IPA and water for about an hour. For the panels coated with a semi-gloss topcoat the topcoat was readily removed and the undercoat could be scrubbed off after about 27 minutes of immersion in Composition D and in PCBTF. The top latex coat became sticky in EB. The panels immersed in IPA and water showed no degradation to the painted surface.

EXAMPLE 4

A clear single phase solution was formed by blending 16 wt % DCBTF, 20 wt % IPA, 36 wt % EB, and 28 wt % water. The resultant liquid mixture was stable for an extended period of time.

EXAMPLE 5

A composition was prepared of 16 wt % PCBTF, 36 wt % EB, and 28 wt % water. That composition had a single phase. However, when 20 wt % 1-butanol or 20 wt % isobutanol was added to the mixture two phases formed, a large organic upper phase and a smaller aqueous lower phase.

EXAMPLE 6

Compositions were prepared that contained IPA, PCBTF, water and EB. A manually air pressurized spray bottle was used to create a fine mist spray of the prepared solutions. Flammability of the system was evaluated using the flame projection test described in ASTM test method D 3065-72. In this test, the bottle is placed six inches from a lit candle and the spray is directed through the upper ⅓ of the flame. A substance is considered to be non-flammable according to the test if it has a flame projection less than 18" without flashback to the nozzle. The following is a list of tested compositions and their flammability ranking.

| Compositions (Weight %) | | | | | Flame Projection Average of | | |
| --- | --- | --- | --- | --- | --- | --- | --- |
| PCBTF | Water | IPA | EB | MMB | 3 (inches) | Flashback | Rank |
| 16 | 28 | 20 | 36 | 0 | 11 | No | Non-Flammable |
| 4 | 40 | 20 | 36 | 0 | 11 | No | Non-Flammable |
| 4 | 28 | 20 | 48 | 0 | 11 | No | Non-Flammable |
| 3 | 56 | 20 | 21 | 0 | 12.6 | No | Non-Flammable |
| 5 | 51 | 40 | 4 | 0 | 8.3 | No | Non-Flammable |
| 8 | 40 | 20 | 0 | 32 | 9 | No | Non-Flammable |
| 8 | 44 | 20 | 28 | 0 | 18 | No | Non-Flammable |
| 8 | 36 | 20 | 36 | 0 | 20 | No | Flammable |
| 8 | 28 | 20 | 44 | 0 | 16.5 | No | Non-Flammable |
| 7 | 46.5 | 20 | 26.5 | 0 | 17 | No | Non-Flammable |
| 6 | 49 | 20 | 25 | 0 | 15 | No | Non-Flammable |

We claim:

1. A liquid composition comprising
   (A) about 2 to about 20 wt % of a solvent having the general formula

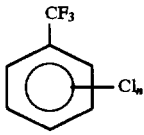

wherein "n" is 1 or 2;
   (B) about 4 to about 50 wt % of a cosolvent having the formula

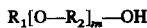

where $R_1$ and $R_2$ are each independently selected from alkyl from $C_1$ to $C_6$ and "m" is 1 or 2;
   (C) 2 to about 40 wt % of an alkanol from $C_1$ to $C_3$, where the total of cosolvent plus alkanol is about 41 to about 68 wt %;
   (D) 0 to about 5 wt % of a surfactant; and
   (E) about 7 to about 56 wt % water, said composition being a single phase.

2. A composition according to claim 1 wherein said solvent is parachlorobenzotrifluoride.

3. A composition according to claim 1 wherein said cosolvent is ethylene glycol monobutyl ether.

4. A composition according to claim 1 wherein said cosolvent is propylene glycol monomethyl ether.

5. A composition according to claim 1 wherein said cosolvent is 3-methoxy-3-methyl-1-butanol.

6. A composition according to claim 1 wherein said alkanol is isopropanol.

7. A composition according to claim 1 wherein said surfactant is anionic.

8. A composition according to claim 1 wherein said solvent is about 5 to about 20 wt %, said cosolvent is about 10 to about 30 wt %, said alkanol is about 2 to about 20 wt %, and said surfactant is about 0.5 to about 05 wt %.

9. A composition according to claim 1 wherein said solvent is about 2 to about 10 wt %, said cosolvent is about 5 to about 30 wt %, said alkanol is about 2 to about 20 wt %, and said surfactant is about 0.5 to about 10 wt %.

10. A composition according to claim 1 wherein said alkanol is about 2 to about 10 wt %.

11. A method of cleaning a hard surface comprising applying a composition according to claim 1 to said surface and removing said composition from said surface.

12. A method of removing paint from a surface comprising applying a composition according to claim 1 to said paint, permitting said composition to remain on said paint until said paint has been at least partially degraded, and stripping said paint from said surface.

13. A liquid composition comprising
    (A) about 5 to about 20 wt % parachlorobenzotrifluoride;
    (B) about 10 to about 30 wt % of a cosolvent having the formula

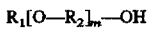

where $R_1$ is alkyl from $C_1$ to $C_4$, $R_2$ is alkyl from $C_1$ to $C_5$, and m is 1 or 2;
    (C) about 2 to about 20 wt % of an alkanol from $C_2$ to $C_3$;
    (D) about 0.5 to about 5 wt % of an anionic surfactant having the formula

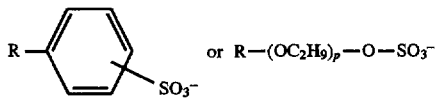

where R is alkyl from $C_{10}$ to $C_{14}$, "p" is an integer from 3 to 18, and the cation is hydrogen, an alkali metal, or ammonium; and
    (E) about 25 to about 82.5 wt % water, said composition being a single phase.

14. A composition according to claim 13 wherein said cosolvent is ethylene glycol monobutyl ether.

15. A composition according to claim 13 wherein said cosolvent is propylene glycol monomethyl ether.

16. A composition according to claim 13 wherein said cosolvent is 3-methoxy-3-methyl-1-butanol.

17. A composition according to claim 13 wherein said alkanol is isopropanol.

18. A composition according to claim 13 wherein said anionic surfactant is sodium dodecyl benzene sulfonate.

19. A method of cleaning a hard surface comprising applying a composition according to claim 13 to said surface and removing said composition from said surface.

20. A liquid composition comprising
    (A) about 10 to about 20 wt % parachlorobenzotrifluoride;
    (B) about 20 to about 40 wt % ethylene glycol monobutyl ether;
    (C) about 10 to about 30 wt % isopropanol;
    (D) about 0.5 to about 5 wt % sodium dodecyl benzene sulfonate; and
    (E) about 5 to about 59.5 wt % water, said composition being a single phase.

21. A composition according to claim 1 wherein the wt % of said surfactant is 0.

* * * * *